(12) United States Patent
Abu-Abed et al.

(10) Patent No.: US 11,314,693 B2
(45) Date of Patent: Apr. 26, 2022

(54) METHOD FOR DATA STRUCTURE RELATIONSHIP DETECTION

(71) Applicant: ROYAL BANK OF CANADA, Montreal (CA)

(72) Inventors: Hisham Abu-Abed, Toronto (CA); Xiuzhan Guo, Toronto (CA); Joel Ian Tousignant-Barnes, Toronto (CA)

(73) Assignee: ROYAL BANK OF CANADA, Toronto (CA)

( * ) Notice: Subject to any disclaimer, the term of this patent is extended or adjusted under 35 U.S.C. 154(b) by 505 days.

(21) Appl. No.: 16/353,804

(22) Filed: Mar. 14, 2019

(65) Prior Publication Data

US 2019/0286617 A1    Sep. 19, 2019

Related U.S. Application Data

(60) Provisional application No. 62/642,916, filed on Mar. 14, 2018.

(51) Int. Cl.

| | | |
|---|---|---|
| *G06F 16/174* | (2019.01) | |
| *G06F 16/901* | (2019.01) | |
| *G06F 16/9038* | (2019.01) | |
| *G06F 16/906* | (2019.01) | |
| *G06N 7/00* | (2006.01) | |
| *G06F 16/215* | (2019.01) | |
| *G06N 20/00* | (2019.01) | |

(52) U.S. Cl.
CPC ........ *G06F 16/1744* (2019.01); *G06F 16/906* (2019.01); *G06F 16/9024* (2019.01); *G06F 16/9038* (2019.01); *G06N 7/00* (2013.01)

(58) Field of Classification Search
CPC ............... G06F 16/1744; G06F 16/906; G06F 16/9038; G06F 16/9024; G06N 7/00
See application file for complete search history.

(56) References Cited

U.S. PATENT DOCUMENTS

| | | | |
|---|---|---|---|
| 8,204,866 B2* | 6/2012 | Chaudhuri | ........ G06F 16/24556 |
| | | | 707/692 |
| 2009/0271405 A1* | 10/2009 | Bayliss | ................. G06F 16/245 |
| 2010/0318499 A1* | 12/2010 | Arasu | ................... G06F 16/215 |
| | | | 707/693 |

OTHER PUBLICATIONS

Atzori, Claudio. "GDup: an Integrated, Scalable Big Graph Deduplication System." (2016). (Year: 2016).*
Jalbert, Nicholas, and Westley Weimer. "Automated duplicate detection for bug tracking systems." 2008 IEEE International Conference on Dependable Systems and Networks With FTCS and DCC (DSN). IEEE, 2008. (Year: 2008).*

(Continued)

*Primary Examiner* — Mohsen Almani
(74) *Attorney, Agent, or Firm* — Norton Rose Fulbright Canada LLP

(57) ABSTRACT

A computer implemented system and method for automated estimation of relationships among a plurality of data elements. The approach includes processing elements of one or more data sets to establish linkage relations among the data records, and then extending the linkage relations based on one or more equivalence relations, stored as linkage data structures. The generated data structures are used for computationally simplifying the data sets by consolidating data records or removing redundancies, such as duplicates, and may be used to yield a compressed data representation or data structure.

20 Claims, 7 Drawing Sheets

(56) References Cited

OTHER PUBLICATIONS

Dalzell, Nicole M., and Jerome P. Reiter. "Regression modeling and file matching using possibly erroneous matching variables." Journal of Computational and Graphical Statistics 27.4 (2018): 728-738. (Year: 2018).*

Lee, Hsuan-Shih. "An optimal algorithm for computing the max-min transitive closure of a fuzzy similarity matrix." Fuzzy sets and systems 123.1 (2001): 129-136. (Year: 2001).*

Rendle S, Schmidt-Thieme L. Active learning of equivalence relations by minimizing the expected loss using constraint inference. In2008 Eighth IEEE International Conference on Data Mining Dec. 15, 2008 (pp. 1001-1006). IEEE. (Year: 2008).*

Fellegi, Ivan P.; Sunter, Alan B., "A Theory for Record Linkage", Dominion Bureau of Statistics, 1969.

* cited by examiner

METHOD FOR DATA STRUCTURE RELATIONSHIP DETECTION

CROSS REFERENCE TO RELATED APPLICATIONS

This application is a non-provisional of, and claims all benefit, including priority to: U.S. Application No. 62/642,916, filed 14 Mar. 2018, entitled: METHOD FOR DATA STRUCTURE RELATIONSHIP DETECTION, incorporated herein by reference.

FIELD

Embodiments of the present disclosure generally relate to the field of data structure processing, and more specifically, embodiments relate to systems and methods for data structure relationship detection.

INTRODUCTION

Data sets are potentially voluminous (e.g., significantly large number of fields, records, columns) and noisy (e.g., having artifacts, spurious data). Big data sets are characterized by high volume, velocity, variety, variability, and veracity. As the volume and velocity of data grows, inference across networks and semantic relationships between entities becomes a greater challenge.

Data sets might have multiple problems, such as, errors, variations and missing data on the information, differences in data captured and maintained by different databases, data dynamics and database dynamics as data regularly and routinely change over time. An example of data changes are name changes due to marriage and divorce.

For voluminous data sets, there may be various relationships between data elements of the voluminous data sets which, if identified, can be used to aid in database/data storage management or generating more efficient data representations and structures. It is important to be able to computationally detect relationships among the data sets and in a particular table to aid in ensuring data cleanliness.

SUMMARY

Data sets are received, for example, from different sources, and data often has formatting problems. Data records often overlap with one another and automatically identifying relations for duplication identification is useful. As described in various embodiments, an improved data structure processing architecture and mechanism, including corresponding devices, systems, and processes are provided.

Computationally determining relationships between data sets (e.g., data elements) in one or more data structures is a technically challenging endeavor. Specific computational approaches are described in various embodiments for detecting, flagging, and/or identifying relationships in a data set or among data sets.

The improved data structure processing architecture and mechanism uses a specific data structure relation to identify record linkages, which is used to search a relation, and to identify duplications. The duplication is flagged for a downstream computing process, and the relations, in an embodiment, are encapsulated in the form of a graph data structure which can be traversed or otherwise processed to identify relationships and probabilities of duplication and/or redundancy. In some embodiments, merged/deleted records are stored or otherwise maintained for traceability and/or verification by a downstream system or a user. The verification can be used for machine training aspects of the linkage generation—for example, accuracy and performance can be tracked and provided as feedback to compare and identify a superior equivalence relation, for example, where multiple relations are possible.

The corresponding generated data structures are useful in various applications and contexts, such as receiving a large amount of customer data with inconsistently labelled clients and generating probabilistic linkages to specific underlying customer data records or profiles to eliminate or reduce duplications. To detect relationships effectively, approaches are described below that normalize the data and then select the equivalence relations and generate their equivalence classes. These equivalence classes are utilized in determining whether there is a linkage between data sets.

Linkages can be learned and developed based on relationships between data from multiple sources, or subsets of a data form a same data source. The relationships identify, for example, similarity, overlaps, data fields in different orders and/or formats. These relationships are stored in a data structure representing the adjacency matrix or the equivalence relation, among others, which when consumed, can be used to transfer the input data sets to generate transformed output data sets. In a specific embodiment, the transformed output data sets are compressed versions of the input data sets where redundant data fields, records, or elements are removed, thereby reducing an overall amount of bandwidth needed to transfer such data sets or to store such data sets.

A computer system is configured for conducting classifications, partitions, relationships by equivalence relations, and so detecting relationships amounts to generating equivalence classes by equivalence relations. Techniques applied include equivalence relation and record linkage.

In an aspect, a computer system for automated estimation of relationships among a plurality of data elements is provided, the system comprising: a data receiver configured to receive one or more input data sets including the plurality of data elements, the one or more input data sets including a set of data records C; a classifier engine computer processor configured to: establish one or more linkage relations among data records in the set of data records C, the one or more linkage relations maintained as an adjacency matrix data structure on a non-transitory computer memory; extend the one or more linkage relations into equivalence relations, updating the adjacency matrix data structure; and generate an output data set by transforming the set of data records C using at least the adjacency matrix data structure, the output data set compressed relative to the set of data records C.

In another aspect, the computer system includes a data encapsulation engine configured to generate a graph data structure based on the stored adjacency matrix data structure, and to control rendering, on a display of a computer device, the graph data structure represented by one or more interactive visual interface elements whose graphical positioning and rendered connections therebetween are determined based at least on the stored adjacency matrix data structure.

In another aspect, a computer implemented method for automated estimation of relationships among a plurality of data elements is provided, the method including: receiving one or more input data sets including the plurality of data elements, the one or more input data sets including a set of data records C; establishing one or more linkage relations among data records in the set of data records C, the one or more linkage relations maintained as an adjacency matrix data structure; extending the one or more linkage relations into equivalence relations, updating the adjacency matrix data structure; and generating an output data set by transforming the set of data records C using at least the adjacency matrix data structure, the output data set compressed relative to the set of data records C.

In another aspect, the output data set is compressed relative to the set of data records C by removing duplicate rows from the set of data records C identified using the adjacency matrix data structure.

In another aspect, the output data set is compressed relative to the set of data records C by merging data records from rows from the set of data records C identified using the adjacency matrix data structure, the merged rows of the output data set including common elements associated with a primary key identifier for each corresponding row.

In another aspect, the establishing of the one or more linkage relations includes apply an algorithm that includes:

```
Input: A set E of entities
Output: A relation function ~: E × E → {0,1}
For each e₁ ∈ E {
    Block = MatchingCandiatesOf(e₁)
    For each e₂ ∈ Block {
Collect similarity scores between e₁ and e₂ according to attributes
selected
Determine weights among attributes and determine similarity cut
off and linkages
Merge and standardize entities among linked entities
Repeat Steps 1-3 based on standardized entities until no more
merges cannot be performed
Assign ~(e₁, e₂) = 1 if e₁~e₂ and ~(e₁, e₂) = 0 otherwise
    }
}
Return ~
```

In another aspect, the extending of the one or more linkage relations into equivalence relations includes generating a graph data structure based on the one or more linkage relations, the graph data structure including a plurality of weights, edges, and nodes, the graph data structure traversable for identifying the corresponding equivalence relation for each linkage relation of the one or more linkage relations.

In another aspect, the equivalence relation is $\stackrel{m}{=}$ and $D_1$ and $D_2$ are defined as subsets of data records in the set of data records C, and the equivalence relation is used to partition the set of data records C into one or more partitions for generating the output data set, the output data set generated by transforming the set of data records C in accordance to the one or more partitions.

In another aspect, the equivalence relation includes: If m is a linear regression model given by (b, $k_1$, ..., $k_t$), where b is an intercept, then $D_1 \stackrel{m}{=} D_2$ if and only if both $D_1$ and $D_2$ satisfy a linear regression model (b, $k_1$, ..., $k_t$), where $\mathbb{S}/\stackrel{m}{=}$ has two equivalence classes: data sets that have the linear regression model (b, $k_1$, ..., $k_t$) and data sets that do not have the linear regression model (b, $k_1$, ..., $k_t$).

In another aspect, the equivalence relation includes: defining $D_1 \stackrel{m}{=} D_2$ if and only if both $D_1$ and $D_2$ satisfy a same linear regression model no matter how their columns are ordered.

In another aspect, the equivalence relation includes the relation:
Let
$$A = \begin{bmatrix} a_{11} & \cdots & a_{1t} \\ \vdots & \ddots & \vdots \\ a_{s1} & \cdots & a_{st} \end{bmatrix}$$

and $D_1 \stackrel{m}{=} D_2$ if and only if both $D_1$ and $D_2$ have A as a sub data set.

In another aspect, the equivalence relation includes the relation: $D_1 \stackrel{m}{=} D_2$, where both $D_1$ and $D_2$ have similar address columns, and string distance is utilized to classify the set of data sets with address columns using a transitivity closure of a similarity relation.

In another aspect, the equivalence relation includes the relation: given a data set D, let $\mathbb{D}$ be the set of all rows in D, define $r_1 \stackrel{m}{=} r_2$ in $\mathbb{D}$ if and only if $r_1 = r_2$, such that $\stackrel{m}{=}$ is an equivalence relation on $\mathbb{D}$, and $\mathbb{D}/\stackrel{m}{=}$ is equivalent to removing row duplicates in D.

In another aspect, the equivalence relation includes the relation: given a data set D with an address column, let D be the set of all rows in D, define $r_1 \stackrel{m}{=} r_2$ in $\mathbb{D}$ if and only if the addresses of $r_1$, $r_2$ are the same, and classifying of each relationship includes the relation where $\stackrel{m}{=}$ is an equivalence relation on D and $D/\stackrel{m}{=}$ is equivalent to finding house holdings in D.

In another aspect, the equivalence relation includes the relation: given two data sets $D_1$ and $D_2$, let $\mathbb{E}$ be the set of all rows in $D_1$ and $D_2$, define $r_1 \stackrel{m}{=} r_2$ in $\mathbb{E}$ if and only if $r_1 = r_2$; and the relation $\stackrel{m}{=}$ is an equivalence relation on $\mathbb{E}$ and $\mathbb{E}/\stackrel{m}{=}$ is equivalent to removing row duplicates in $D_1$ and $D_2$ and identifying row linkages between $D_1$ and $D_2$.

In another aspect, the equivalence relation includes the relation: given a dataset D and two equivalence relations $\stackrel{m}{=}_1$ and $\stackrel{m}{=}_2$ on rows of D, consider rows of D as vertices and draw edges between two vertices if the two vertices in the same equivalence class of $\stackrel{m}{=}_1$ or $\stackrel{m}{=}_2$; and classifying of each relationship includes classifying the rows of D by the connected components of the resulted undirected graph and denoting the equivalence relation generated by the classifications by $\stackrel{m}{=}_1 \smile \stackrel{m}{=}_2$.

In another aspect, the equivalence relation includes classifying a set of data sets by $\stackrel{m}{=}$ as complete.

In another aspect, the equivalence relation includes the relation:
Given two sets of data sets $\mathbb{D}_1$ and $\mathbb{D}_2$, a transitive equivalence relation $\stackrel{m}{=}$ on $\mathbb{D}_1$, and a set function $f: \mathbb{D}_1 \to \mathbb{D}_2$ such that $D_1 \stackrel{m}{=} D_2$ implies $f(D_1) = f(D_2)$ then induced functions are provided: $\pi: \mathbb{D}_1 \to \mathbb{D}_1/\stackrel{m}{=}$ and $f\stackrel{m}{=}: \mathbb{D}_1/\stackrel{m}{=} \to \mathbb{D}_2$ such that $f = f\stackrel{m}{=} \pi$:

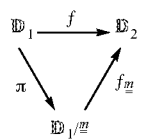

Let $\stackrel{m}{=}_1$ and $\stackrel{m}{=}_2$ be equivalence relations on X and Y, respectively and let f:X→Y be a function such that
$x\stackrel{m}{=}_1 y \Rightarrow f(x)\stackrel{m}{=}_2 f(y)$;
where $\tilde{f}$ is defined by $\tilde{f}([x])=[f(x)]$:

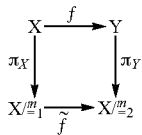

In another aspect, the equivalence relation includes: generating equivalence relations by subsets $\mathbb{S} \subseteq \mathbb{D} \times \mathbb{D}$, and to detect all equivalence relations and partition a set $\mathbb{D}$ of data sets, the method further includes: finding all subsets $\mathbb{S}$ of $\mathbb{D} \times \mathbb{D}$; and generating one or more equivalence relations from $\mathbb{S}$ (equivalence relation closure of $\mathbb{S}$).

A non-transitory computer readable medium storing machine interpretable instructions, which when executed by a processor, cause the processor to perform a method for automated estimation of relationships among a plurality of data elements, the method comprising: receiving one or more input data sets including the plurality of data elements, the one or more input data sets including a set of data records C; establishing one or more linkage relations among data records in the set of data records C, the one or more linkage relations maintained as an adjacency matrix data structure; extending the one or more linkage relations into equivalence relations, updating the adjacency matrix data structure; and generating an output data set by transforming the set of data records C using at least the adjacency matrix data structure, the output data set compressed relative to the set of data records C.

DESCRIPTION OF THE FIGURES

In the figures, embodiments are illustrated by way of example.

It is to be expressly understood that the description and figures are only for the purpose of illustration and as an aid to understanding.

Figure 1:
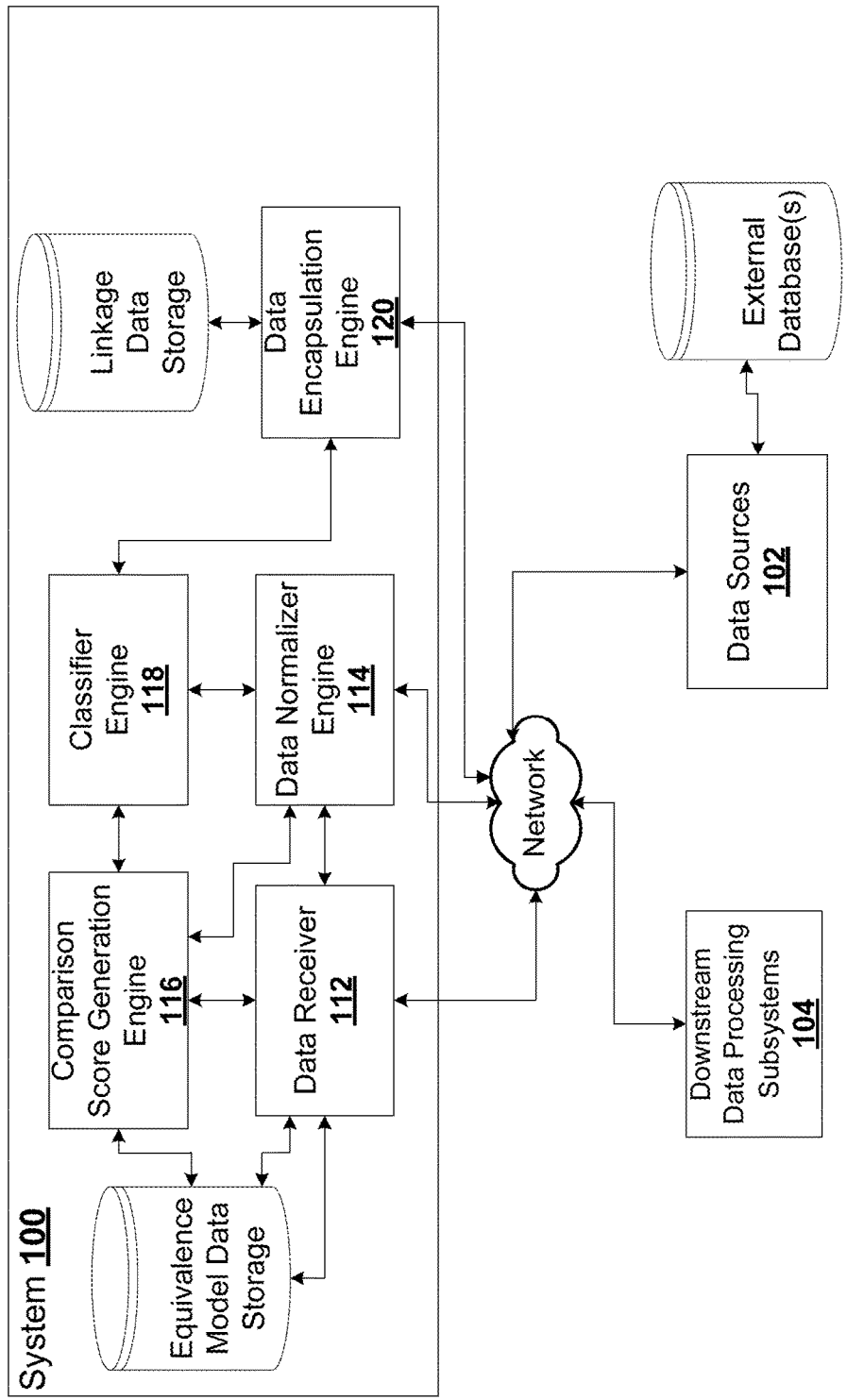

Embodiments will now be described, by way of example only, with reference to the attached figures, wherein in the figures:

FIG. 1 is a block schematic of an example computing system configured for automated estimation of relationships among a plurality of data elements.

Figure 2:
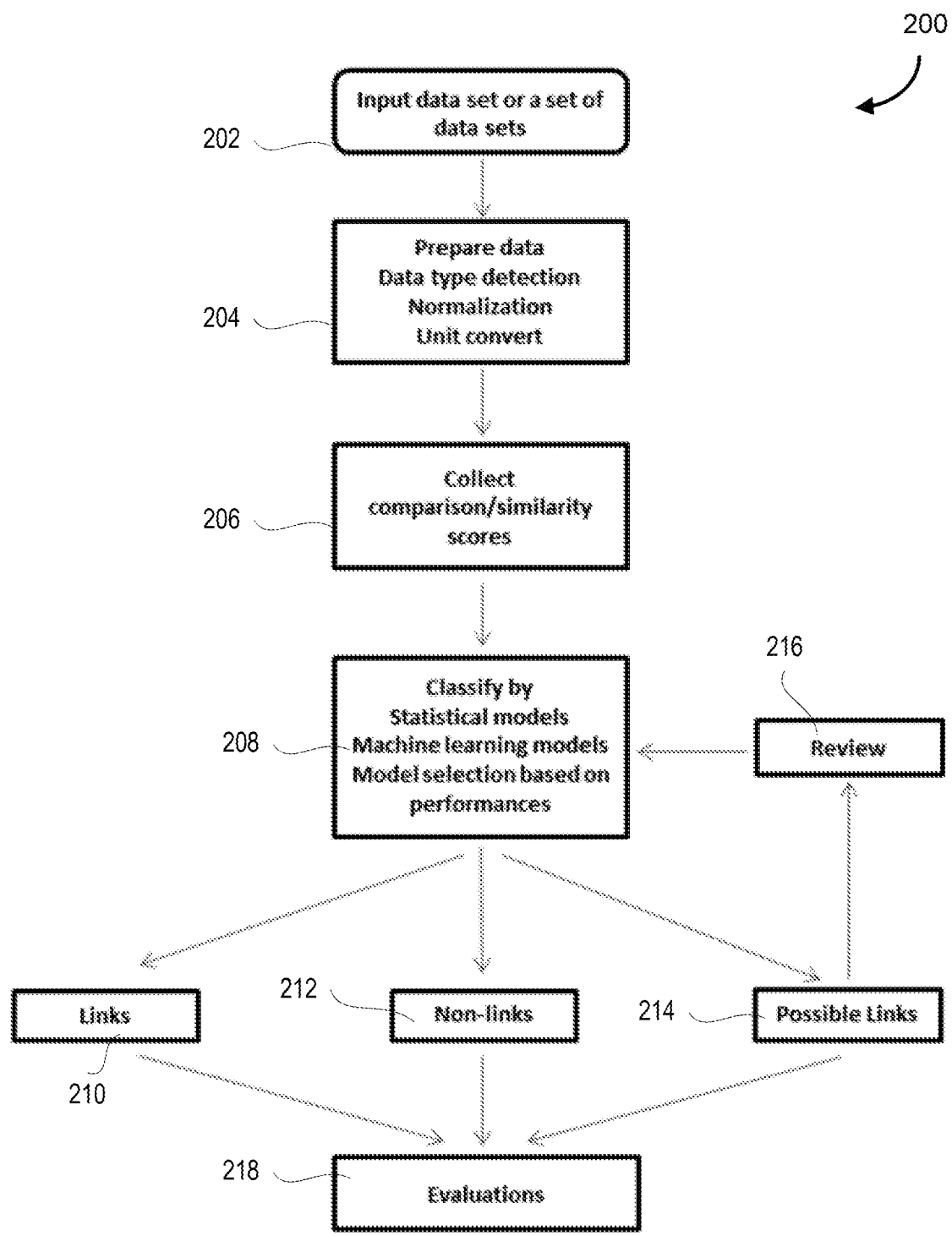

FIG. 2 is a computational method for generating equivalence relations, and defining equivalence classes, according to some embodiments.

Figure 3:
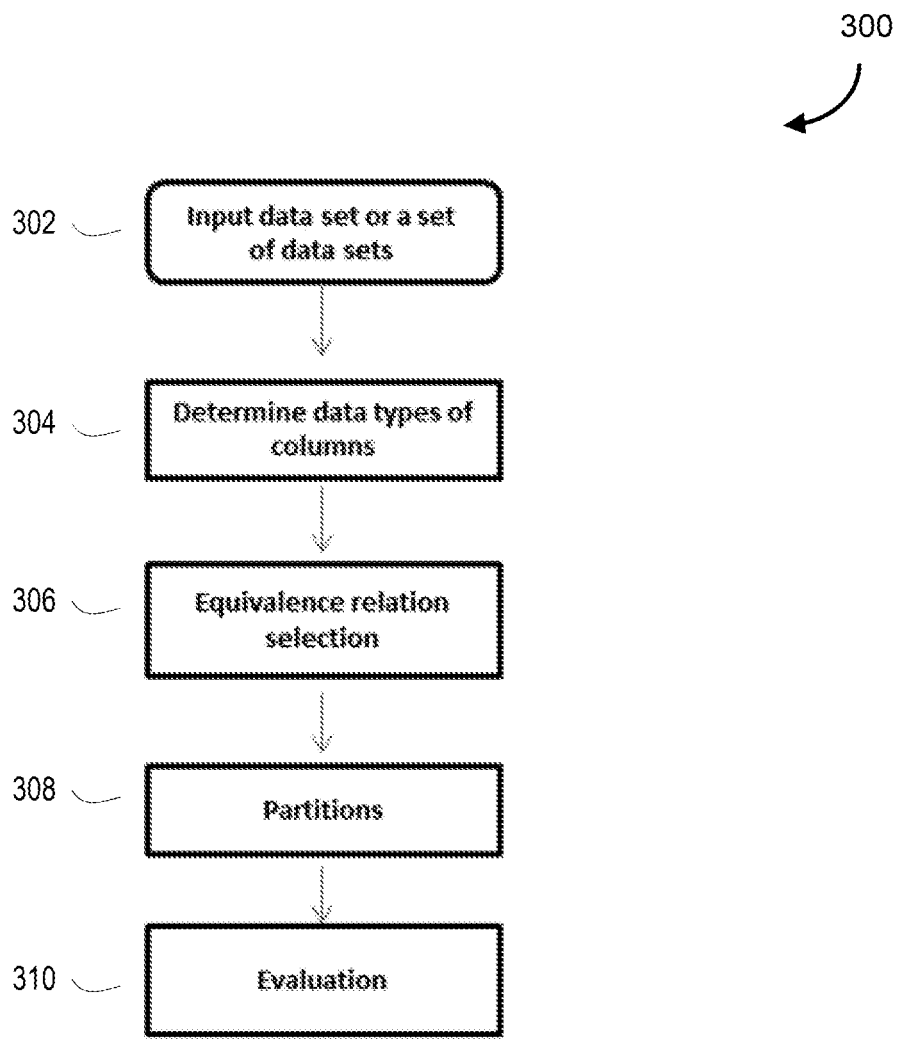

FIG. 3 is an alternate process diagram illustrating a computational method for generating equivalence relations, and defining equivalence classes, according to some embodiments.

Figure 4:
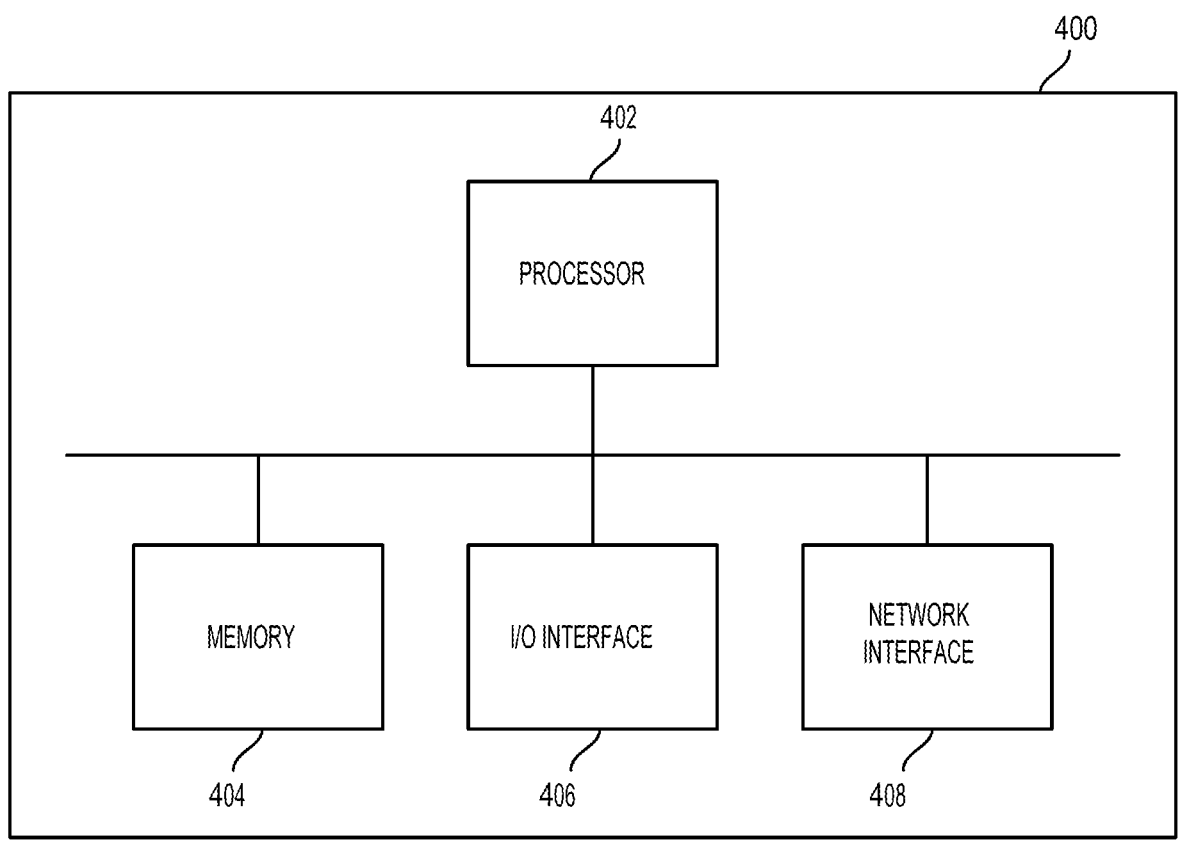

FIG. 4 is a schematic diagram of a computing device, according to some embodiments.

Figure 5A:
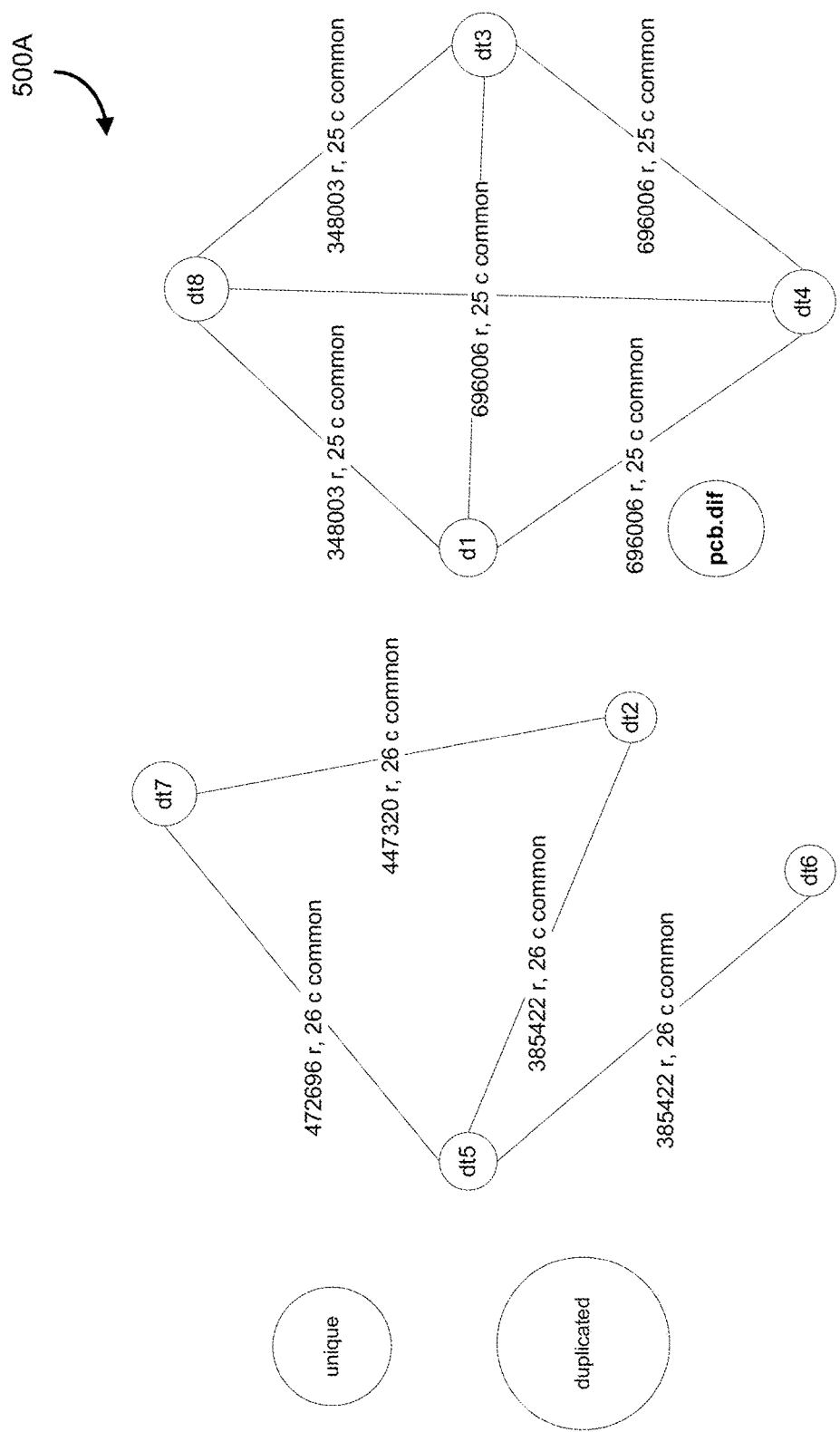
Figure 5B:
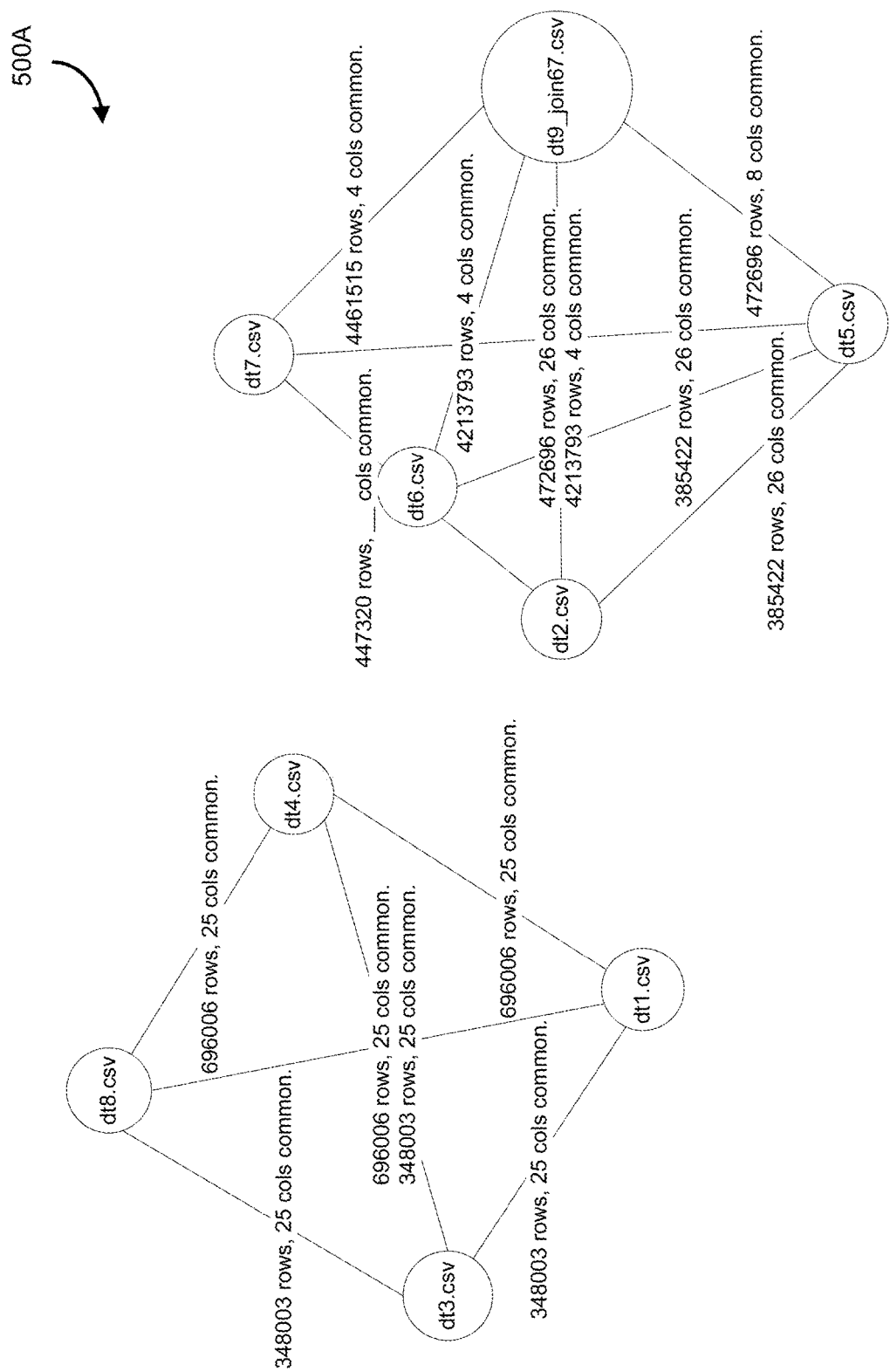

FIG. 5A and FIG. 5B are screenshots of example interfaces indicating linkages, according to some embodiments.

Figure 6:
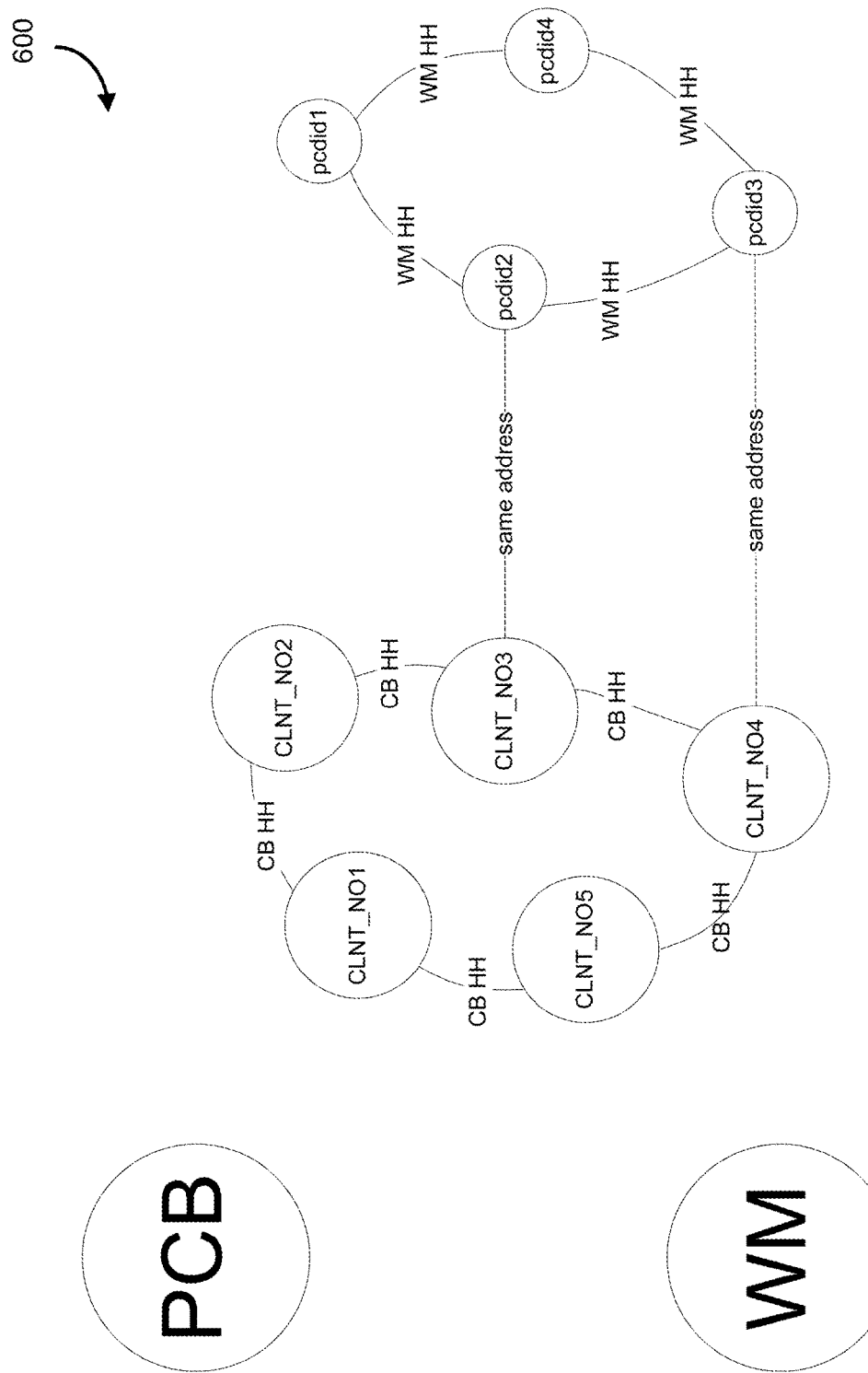

FIG. 6 is a screenshot of an example interface indicating linkages, according to some embodiments.

DETAILED DESCRIPTION

The possible solution of detecting relationships in a data set and among data sets are discussed and provided. Data structure relationships are computationally complex and difficult to represent. Detecting relationships in a given data set or a set of data sets is equivalent to mining relationship properties and classifying the objects by the relationship properties. Classifying a set of objects, on the other hand, is equivalent to defining equivalent relations on the set. The described processors unify the approaches of classifications, partitions, relationships by equivalence relations so that detecting relationships amounts to generating equivalence classes by equivalence relations.

Improved data structures, architectures, and systems are described that are directed to solving technical problems related to classification, which can be used, among others, in relation to entity matching, establishing relations among tables, housing holding relationships. Classifying a set of entities correctly is equivalent to defining a correct equivalence relation. The adapted approaches described herein are directed to specific improvements of prior art systems that allow for the large scale and automated consolidation of information, for example, received by one or more remote/disparate databases or data sources that has increased resistance to perturbations in data or data cleanliness issues, including issues with non-standardization.

A technical approach, along with specific algorithms, are provided below which are directed to machine-interpretable instruction sets that when executed by a processor, cause the processor to perform the specific computer functions of some claimed embodiments described herein, which, in some cases, converts a device into a special purpose machine.

As described herein, a number of approaches are unified together by equivalence relations, including entity matching, relations among tables in a database, house holding relationships.

In Algorithm 1, Applicants introduce Merge and Standardization step by algebraic operations.

Without the step, the linkage relation produced might not be transitive, commutative, and associative and some linkages might miss (C3 would not link without merging C1 and C2 in Scenario 1) so that there might be contradictions within the matching results.

Applicants also integrate graph algorithms (connected components) to extend the entity relations that are not equivalence relations. The graph results produced in Algorithms 2 and 3 can be used to not only visualize the equivalence relations but also mine the insights for entity relations (master tables search in Scenario 2).

One can identify relations and so equivalence relations as data structures can be maintained by sets or adjacency matrices. Algorithms 1, 2, and 3 above can transform relations into equivalence relations.

Both relations and graph can be represented by adjacency matrices data structures. Once the system generates the adjacency matrix of an equivalence relation or a relation, the system can also produce its graph visualization such that an individual can mine the insights.

The graph visualization includes controlling a display of a computing device to render a graphical user interface having visual interface elements whose visual features (e.g., positioning, radius) is determined based on the data stored within the adjacency matrix. The data determines the lengths of connections, which data points and elements should be represented as edges or nodes, etc.

Accordingly, a user may then visually determine and map relationships between data elements, and in a downstream system, provide inputs indicating, for example, which probabilistically identified relationships should be established and which can be ignored.

A graphing module (e.g., software and/or hardware) can receive the data structures and generate plots accordingly. Example plots are provided in the figures.

Two example scenarios are described below:

Scenario 1: The data receiver obtains a table C of Financial Institution (FI) client info, which is combined from the tables from multiple lines of business, i.e., P&CB, WM, I&TS, CAP, so that the client info was formatted differently.

A client might have both P&CB and WM accounts or both WM and CAP accounts and so the table C has duplicates.

A system needs to link together the FI clients who have multiple accounts from different sources, for example P&CB and WM, assign them a unique ONE FI client number, remove duplicates and keep only one record in the table C.

Assume that C=

| Client_ID | Client_NM | Client_Addr | Post_Code | Client_Phone | Client_Email | Client_SR |
|---|---|---|---|---|---|---|
| C1 | Joe Doe | 1, 23 Avenue | X1X2Y2 | 123-4567 | jdoe@xmail | P&CB |
| C2 | J. Doe | 23 Avenue, #1 | X1X2Y2 | 234-5678 | jdoe@xmail | P&CB |
| C3 | Joe D. | 1, 23 Av. | X1X2Y2 | 234-5678 | | WM |
| C4 | John Smith | 123 Avenue | Z1X2A2 | 999-9999 | | WM |
| C5 | Smith, J. | 123 Av. | Z1X2A2 | 999-9999 | Smith@ymail | CAP |

Scenario 2: Consider a set of data sets in FI HDFS, where the system is required to detect relations among these datasets so that a downstream system can interpret how they are related, which data sets are most important, and which are redundant so that they can be removed from the database.

For example, the system receives the following 6 tables denoted by dt1, dt2, dt3, dt4, dt5, dt6:

| Id | ph | Acct | addr |
|---|---|---|---|
| 1 | A | 101 | X1 |
| 2 | B | 102 | X2 |
| 3 | C | 103 | X3 |
| 4 | D | 104 | X4 |
| 5 | E | 105 | X5 |

| Id | ph | addr | acct |
|---|---|---|---|
| 10 | A | Y1 | 101 |
| 4 | D | Y2 | 104 |
| 3 | cf | Y3 | 103 |
| 2 | B | Y4 | 102 |
| 5 | E | Y5 | 105 |

| Id | ph | Acct |
|---|---|---|
| 2 | B | 102 |
| 4 | D | 104 |
| 5 | E | 105 |

| Id | ph | Acct |
|---|---|---|
| 4 | D | 104 |
| 3 | CF | 103 |
| 2 | B | 102 |

| Col1 | Col2 | Col3 | Col4 | Col5 |
|---|---|---|---|---|
| 1000 | xy | 2000 | Edg | Add1 |
| 1001 | abc | 3000 | Email | Add2 |
| 1002 | eq | 4000 | Qid | Add3 |
| 1001 | abc | 3000 | Email | Add2 |
| 1000 | xy | 2000 | Edg | Add1 |

| Id | ph | Acct |
|---|---|---|
| 3 | CF | 103 |
| 2 | B | 102 |
| 4 | D | 104 |

FIG. 1 is a block schematic of an example computing system configured for automated estimation of relationships among a plurality of data elements.

The computing system 100, in some embodiments, is a physical computer system having at least one processor and memory, with machine readable instructions stored thereon. The instructions control the operation of the processor.

The computing system 100 includes communication interfaces with devices, such as data sources 102, and downstream data processing subsystems 104, such as data warehouses, data repositories, etc. The downstream data processing subsystems 104 utilize processed data, including the identified data linkages, to perform various data processing or transformation functions, such as generating reports, normalization of data, data cleaning, classification, among others.

The data linkages, can be used for compressing or generating transformed versions of the original data sets for downstream consumption by downstream computing systems. As described herein, the data linkages are established through one or more linkage relations that are maintained as an adjacency matrix data structure on a non-transitory computer memory.

Data sources 102 include relational databases, non-relational databases, flat files, data warehouses, etc. Downstream data processing subsystems 104 also include relational databases, non-relational databases, flat files, data warehouses, etc., and also production systems and operational systems which consume the data and the linkages.

The computing system 100 receives input data sets in the form of one or more input data structures, and is configured to process the one or more input data structures using specific computational approaches to computationally estimate linkages between data sets and/or data elements.

These estimated linkages are stored in the form of identified relationships, and in some embodiments, are provided as a linkage data structure (an adjacency matrix data structure, in some embodiments). The linkage data structure, in accordance with some embodiments, is utilized to transform or otherwise augment the input data structure such that a hybrid data structure can be provided whereby the input data elements are populated or associated with the linkages, providing an enhanced data structure. In some embodiments, a transformed data structure is generated where the adjacency matrix data structure is used to consolidate, remove, or otherwise compress the input data elements to establish a transformed output data set.

In some embodiments, computing system 100 includes a data receiver 112 configured to receive the input data sets including the plurality of data elements from the data sources 102. A data normalizer engine 114 pre-processes the one or more data sets to normalize the one or more data sets for conducting linkage analysis.

The data receiver 112 is configured to receive, for example, data sets of customer data, represented in the form of relational database records, flat files, or spreadsheets.

These data sets can, for example, include rows and columns, with individual records being represented across rows (client ID) and columns representing data fields for each record (e.g., client email, phone). For example, each data set row can correspond to a unique primary key that is used to uniquely identify rows.

A challenge with data sets is that data is typically very voluminous (e.g., thousands or millions or rows), and the data is collected over a period of time, and from different sources. Accordingly, the data sets themselves may have data quality issues, or have inconsistencies in entry and/or recordation. In these situations, it may be useful for downstream processing to conduct initial pre-processing of the data to remove duplicates or consolidate data set elements or rows.

For example, underlying data may have duplication in respect of specific client identifiers, and the data set could be compressed into a reduced storage representation by reducing and/or removing redundancy. Similarly, while there may be redundant entries, there may be different amounts of data in the redundant entries, and in some cases, it may be useful to generate a consolidated entry with a maximally generated set of consolidated data from the underlying source data.

A comparison score generator engine 116 is configured to generate comparison scores indicative of the relationships between data elements of the plurality of data elements. This comparison score, for example, can include using string distances and similarity score generation, which can be encapsulated into an intermediary data structure that is utilized to generate data linkages and/or ultimately data equivalence relations.

A classifier engine 118 is configured to classify each relationship of the relationships as either a linkage, no linkage, or a possible linkage. The classification of the relationship is a non-trivial technical challenge.

Accordingly, as described in further detail in various example embodiments, a specific computational approach is used to establish a data structure element, the linkage relation, which is then transformed (e.g., extended) into an equivalence relation where possible.

A new data structure representation is generated for each equivalence class, and a maximal element is defined as a representation for the equivalence relation. The algorithmic approaches described in some embodiments are applied to form the relation and then to transform the relation into the equivalence relation.

Applicants have tested this approach on a number of applications, and provide two example scenarios describing the approach in conjunction with example data sets. For example, tables in a database can be generated by operations such as join, meet, combine, subset, and the relation between two tables can be defined by determining if there are common rows and columns (common elements) between them.

Algorithm 1 is applied to establish the relation among tables, and since the approach considers common rows and columns, table headers can be used to build the set of matching candidates. For example, only a subset of elements need to be compared.

A data encapsulation engine 120 is configured to encapsulate and return an output data structure storing the relationships along with data element identifiers indicative of which data elements of the plurality of data elements the relationships are established between, the output data structure including one or more classifications, each corresponding to a corresponding relationship.

In some embodiments, data encapsulation engine 120 includes a graph generation engine that builds a graph data structure with the extended equivalence relation, building a new graph by tables as vertices and draw edges between tables if they have common elements. The relation can be extended by the connected components of the graph and/or transitive closure if necessary.

FIG. 2 is a computational method for generating equivalence relations, and defining equivalence classes, according to some embodiments.

At step 202, the input set or a set of data sets is received by the data receiver 112. The data sets are normalized, and prepared for processing at 204.

This processing may include unit conversion, data type detection (e.g., if implied typing is required), data trimming, among others.

At 206, comparison and similarity scores are generated. A number of different approaches are described below in assessing equivalence relations and partitions. Equivalence classes, relations, and partitions are utilized to establish the comparison and similarity scores through processing the data elements to identify linkages or possible linkages.

Different approaches may need selection for effectiveness, and in some embodiments, different statistical models, machine learning models, among others, are utilized to identify which approach to use at 208.

The set of possible links, 214, may be passed back in a feedback loop 216 for assessing the effectiveness of a model. If a particular model is not effective (e.g., has a large proportion of possible links), an alternate model (or a same model having a variation in parameters) is utilized. The output from the process is a set of links 210, a set of non-links 212, and a set of possible links 214, which are evaluated to establish effectiveness at 218, and where effectiveness is determined to be greater than a threshold effectiveness level, the evaluated data set of linkage information is provided to downstream data processing subsystems 104.

FIG. 3 is an alternate process diagram illustrating a computational method for generating equivalence relations, and defining equivalence classes, according to some embodiments.

At 302, the input data set is received, and at 304, the data types of columns is established. At 306, as described in relation to FIG. 2, an equivalence relation is selected that is utilized to partition the data into the data structure storing data linkages, which is then passed at an evaluation stage 310 to the downstream data processing subsystems 104.

Equivalence Relations

On a given set, equivalence relations and partitions are equivalent. Given a set S, a subset R⊆S×S is called a relation on S. R is an equivalence relation if and only if it is reflexive, symmetric and transitive:

For all s∈S, (s, s)∈R;
(s, t)∈R⇒(t, s)∈R;
(s, t), (t, u)∈R⇒(s, u)∈R.

The equivalence class [s] of s under R is defined to be [s]={x∈S|(s, x)∈R}. All equivalence classes S/R under R form a partition of S.

There is an isomorphism I between all equivalence relations $\Re(S)$ and $\mathfrak{P}(S)$ given by R↦S/R. $\mathfrak{P}(S)$ is a partially ordered set (poset) with the refinement order: R≤R' if and only if each equivalence class of R is contained in an equivalence class of R' and so it is a lattice with the two trivial partitions of S as its minima and maximal elements.

By the isomorphism I, $\Re(S)$ is also a lattice with the join and meet given by:

$$R \vee R' = I^{-1}(I(R) \vee I(R')),$$

$$R \wedge R' = I^{-1}(I(R) \wedge I(R')).$$

To classify/partition a set $\mathbb{S}$ of data sets using equivalence relations, there needs to be an equivalence relation on $\mathbb{S}$. Given two data sets $D_1$ and $D_2$ and a transitive model property m, define $D_1 \stackrel{m}{=} D_2$ if both $D_1$ and $D_2$ share property m.

A transitive model property can be linear regression model, a data column dependency graph, or a sub data set.

Clearly, $\stackrel{m}{=}$ is reflexive, symmetric and transitive and accordingly, in some embodiments, $\stackrel{m}{=}$ is an equivalence relation on data sets.

Hence the set $\mathbb{S}$ of data sets can be partitioned by $\stackrel{m}{=}$. Some examples for partitioning are as follows:

If m is the linear regression model given by (b, $k_1$, ..., $k_r$), where b is the intercept, then $D_1 \stackrel{m}{=} D_2$ if and only if both $D_1$ and $D_2$ satisfy the linear regression model (b, $k_1$, ..., $k_r$).

Then $\mathbb{S}/_{\stackrel{m}{=}}$ has two equivalence classes: data sets that have the linear regression model (b, $k_1$, ..., $k_r$) and data sets that do not have the linear regression model (b, $k_1$, ..., $k_r$).

Define $D_1 \stackrel{m}{=} D_2$ if and only if both $D_1$ and $D_2$ satisfy a same linear regression model. Then $\mathbb{S}/_{\stackrel{m}{=}}$ has multiple equivalence classes: each one has the data sets that have the same linear regression model. All data sets within one equivalence class are the same up to linear regression model. Two data sets equal if and only if they share the same linear regression model no matter how their columns are ordered.

Let:

$$A = \begin{bmatrix} a_{11} & \cdots & a_{1t} \\ \vdots & \ddots & \vdots \\ a_{s1} & \cdots & a_{st} \end{bmatrix}$$

Define $D_1 \stackrel{m}{=} D_2$ if and only if both $D_1$ and $D_2$ have A as a sub data set. Then classifying $\mathbb{S}$ amounts to looking all data sets that have A as a sub data set.

Let $D_1 \stackrel{m}{=} D_2$ be given by that both $D_1$ and $D_2$ have "similar" address columns (say, the string distance scores of address columns of $D_1$ and $D_2$ are between 0 and 0.1). Then it is reflexive and symmetric but not transitive and so is not an equivalence relation. Hence, to use the similarity by string distance to classify the set of data sets with address columns, the system needs to form the transitivity closure of the similarity relation: the smallest set that contains the relation and is transitive. Explicitly, let SimilarSets⊆$\mathbb{S}$ be given by:

$$\text{SimilarSets} = \{(D_1, D_2) | D_1 \stackrel{m}{=} D_2 \wedge D_1, D_2 \in \mathbb{S}\}.$$

Then the transitive closure of SimilarSets is $$\bigcup_{i=1}^{\infty} \text{SimilarSets}^i$$

Given a data set D, let $\mathbb{D}$ be the set of all rows in D, define $r_1 \stackrel{m}{=} r_2$ in $\mathbb{D}$ if and only if $r_1 = r_2$. Then $\stackrel{m}{=}$ is an equivalence relation on $\mathbb{D}$ and $\mathbb{D}/_{\stackrel{m}{=}}$ is equivalent to removing row duplicates in D.

Given a data set D with an address column, let $\mathbb{D}$ be the set of all rows in D, define $r_1 \stackrel{m}{=} r_2$ in $\mathbb{D}$ if and only if the addresses of $r_1$, $r_2$ are the same. Then $\stackrel{m}{=}$ is an equivalence relation on $\mathbb{D}$ and $\mathbb{D}/_{\stackrel{m}{=}}$ is equivalent to finding house holdings in D, where the house holding relationship means that the clients have the similar home address.

Given two data sets $D_1$ and $D_2$, let $\mathbb{E}$ be the set of all rows in $D_1$ and $D_2$. Define $r_1 \stackrel{m}{=} r_2$ in $\mathbb{E}$ if and only if $r_1 = r_2$. Then $\stackrel{m}{=}$ is an equivalence relation on $\mathbb{E}$ and $\mathbb{E}/_{\stackrel{m}{=}}$, the set of all equivalence classes under $\stackrel{m}{=}$, is equivalent to removing row duplicates in $D_1$ and $D_2$ and identifying links between $D_1$ and $D_2$.

Given a dataset D and two equivalence relations $\stackrel{m}{=}_1$ and $\stackrel{m}{=}_2$ on rows of D, consider rows of D as vertices and draw edges between two vertices if the two vertices in the same equivalence class of $\stackrel{m}{=}_1$ or $\stackrel{m}{=}_2$. Now classify the rows of D by the connected components of the resulted undirected graph and denote the equivalence relation generated by the classifications by $\stackrel{m}{=}_1 \smile \stackrel{m}{=}_2$; this approach can be used to merge $\stackrel{m}{=}_1$ and $\stackrel{m}{=}_2$ by graphs.

As partitions/classifications and equivalence relations on a given set are equivalent, classifying/partitioning a set of data sets can always be done by a $\stackrel{m}{=}$.

In an alternative approach, the method includes classifying a set of data sets where $\stackrel{m}{=}$ is complete.

Given two sets of data sets $\mathbb{D}_1$ and $\mathbb{D}_2$, a transitive equivalence relation $\stackrel{m}{=}$ on $\mathbb{D}_1$, and a set function $f: \mathbb{D}_1 \to \mathbb{D}_2$ such that $D_1 \stackrel{m}{=} D_2$ implies $f(D_1) \stackrel{m}{=} f(D_2)$ then there are induced functions, showing equivalence classes of $\mathbb{D}_1$ can be linked to $\mathbb{D}_2$:
$\pi: \mathbb{D}_1 \to \mathbb{D}_1/\stackrel{m}{=}$ and $\tilde{f} \stackrel{m}{=} : \mathbb{D}_1/\stackrel{m}{=} \to \mathbb{D}_2$ such that
$f = \tilde{f} \stackrel{m}{=} \pi: f$

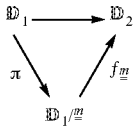

Let $\stackrel{m}{=}_1$ and $\stackrel{m}{=}_2$ be equivalence relations on X and Y, respectively and let $f: X \to Y$ be a function such that $x \stackrel{m}{=}_1 y \Rightarrow f(x) \stackrel{m}{=}_2 f(y)$. Then there is the following commutative diagram, where $\tilde{f}$ is defined by $\tilde{f}([x]) = [f(x)]$:

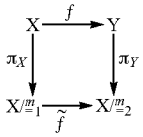

Hence the relations between the equivalence classes can be induced by the original relations between sets X and Y.

In some embodiments, the induced functions can be used to validate and couple different equivalence relations to allow for an even comparison between the equivalence relations. The induced functions can thus be utilized to compare accuracy levels and outcomes for potential selection of an optimal equivalence relation where there are multiple options available. In a further embodiment, equivalence relation feedback is tracked and applied with machine learning feedback to help a system 100 learn when a particular equivalence relation would be superior to another, and to select an optimal equivalence function when there are multiple selections available.

In an alternative approach, the method includes determining equivalence relations by the following relation: given a set $\mathbb{D}$ of data sets, any subset $\mathbb{S} \subseteq \mathbb{D} \times \mathbb{D}$ can generate an equivalence relation and on the other hand, any equivalence relation on $\mathbb{D}$ gives rise to a subset of $\mathbb{D} \times \mathbb{D}$.

Equivalence relations on a set $\mathbb{D}$ of data sets can be also generated by subsets $\mathbb{S} \subseteq \mathbb{D} \times \mathbb{D}$. To detect all equivalence relations and partition a set $\mathbb{D}$ of data sets, the approach includes: (1) find all subsets $\mathbb{S}$ of $\mathbb{D} \times \mathbb{D}$; and (2) generate equivalence relation from $\mathbb{S}$ (equivalence relation closure of $\mathbb{S}$).

Record Link

Record linkage is an approach for classifying records from two or more files as links, possible links, and non-links. With fixed bounds on the error rates, a linkage rule is useful (e.g., optimal in the sense that it minimizes the set of possible links). Using record linkage techniques, the system can join two or more heterogeneous data sets or remove duplicates from a single data set and so determine linkages in a data set or among data sets.

After normalizing data, the comparison score generator engine 116 collects similarity/relationship scores calculated by string distances. Record linkage is a classification problem based on similarity scores. Hence machine learning algorithms are applicable, and in some embodiments, are utilized to determine the similarity/relationship scores.

Each string distance has its strength and weakness and no single string distance is perfect. Also, no single model is perfect and models may be combined together based on their performances.

In an example embodiment, the approach combines Fellegi-Sunter approach with both supervised and unsupervised machine learning algorithms, such as, and not limited to, k-means clustering, bagged clustering, recursive partitioning trees, stochastic boosting, support vector machines, and neural networks and select the best model based on their performances on blocks. Any classifications/partitions, including record linkages, can be generated by equivalence relations.

SOLUTIONS TO EXAMPLE SCENARIOS

Using approaches described in some embodiments and the algorithms described below, solutions are proposed to the above example scenarios. The described solutions are non-limiting example implementation descriptions meant to be illustrative in respect of using equivalence relations by a system tasked with generating linkages for downstream consolidation or redundancy removal (e.g., for compressing data sets as a pre-processing set).

The step numbers are based from Algorithm 1: EntityRelations.

Steps 5-7 in Algorithm 1 include: comparing with any other machine learning or statistical models and determining best matching results based on performances on labeled data.

Steps 5-7 are utilized when the data is more complex, and can be embedded in an example solution provided below.

Example Solution to Scenario 1

Since records {C1, C2, C3, C4, C5} in the table C are from different sources in FI and are formatted in different ways when received by data receiver 112, the system 100 must first establish linkage relations among these records.

To classify these records, the classifier engine 118 needs to extend the linkage relation into an equivalence relation. To remove the duplicated records, the classifier engine 118 shall find the representation for each equivalence class. The approach defines the maximal element, i.e., the record has the maximal info to be the representation for the equivalence relation. The classifier engine 118 can be configured to apply Algorithm 1 below to form the relation and then apply Algorithm 2 to extend the relation to an equivalence relation.

Algorithm 1: EntityRelations Walkthrough

Input: A Set of Records {C1, C2, C3, C4, C5}

Start from C1 (the first row in Table C), use, for example, Post_Code to form Block for C1: {C2, C3}. We only compare C1 with C2 and C3 not with C4 and C5 as they have the different Post_Code and cannot be the same records.

Step 1: Use string distance (that measures how different between two strings) to collect similarity scores between C1 and C2 with attributes:

| Client_ID | Client_ID | Client_NM_Score | Client_Addr_Score | Post_Code_Score | Client_Phone_Score | Client_Email_Score |
|---|---|---|---|---|---|---|
| C1 | C2 | 0.85 | 0.97 | 1 | 0.88 | 1 |
| C1 | C3 | 0.78 | 0.88 | 1 | 1 | NA |

Step 2: To compare C1 and C2 easily, classifier engine 118 compares the attribute scores into one score based on importance of attributes:

| Client_ID | Client_ID | Weighted_Score |
|---|---|---|
| C1 | C2 | 0.93 |
| C1 | C3 | 0.89 |

Cut-off for them is 0.89 by EM algorithm (a cut off determination algorithm) or the importance of attributes. So C1 and C2 linked but C1 and C3 are not this time.

Step 3: As C1 and C2 are linked (or the same), classifier engine 118 merges their info together to have a new record C1' that has the maximal and standard info:

| Client_ID | Client_NM | Client_Addr | Post_Code | Client_Phone | Client_Email |
|---|---|---|---|---|---|
| C1' | Joe Doe | No. 1, 23 Avenue | X1X2Y2 | {123-4567, 234-5678} | jdoe@xmail |

Step 4: Now classifier engine 118 uses C1' to compare with C3 again. Then C3 and C1' are linked as they have now the same phone number. Clearly, without the Step 3, C3 would not link to C1 and C2.

Step 5 (in Some Variant Embodiments where the Data is Complex): Build statistical or machine learning model M (for example, a logistic regression model) on the data.

Step 6 (in Some Variant Embodiments where the Data is Complex): Calculate scores of the results from Steps 1-4 and the scores from model M Step 7 (in Some Variant Embodiments where the Data is Complex): By the score performances, Determine if $e_1 \sim e_2$.

Similarly, classifier engine 118 is adapted to establish the linkage relation between C4 and C5.

Hence C1, C2, and then C3 have linkage relation by merge and C4 and C5 have also the linkage relation.

Step 8: As C1, C2, and C3 have linkage relation and C4 and C5 have the relation too, function~is easy to define.

With the help of merge and standardization, C3 is linked with C1 and C2. However, in many cases, the linkage relation might not be an equivalence relation and classifier engine 118 needs to apply Algorithm 2 or Algorithms 4-6 below to extend it into an equivalence relation. In the simple case, it is already an equivalence relation.

Therefore we can assign each client a unique ONEFI ID:

| Client_ID | ONEFI_ID | Client_NM | Client_Addr | Post_Code | Client_Phone | Client_Email | Client_SR |
|---|---|---|---|---|---|---|---|
| C1 | 1 | Joe Doe | 1, 23 Avenue | X1X2Y2 | 123-4567 | jdoe@xmail | P&CB |
| C2 | 1 | J. Doe | 23 Avenue, #1 | X1X2Y2 | 234-5678 | jdoe@xmail | P&CB |
| C3 | 1 | Joe D. | 1, 23 Av. | X1X2Y2 | 234-5678 | | WM |
| C4 | 2 | John Smith | 123 Avenue | Z1X2A2 | 999-9999 | | WM |
| C5 | 2 | Smith, J. | 123 Av. | Z1X2A2 | 999-9999 | Smith@ymail | CAP |

To remove duplicates and keep the records with maximal info (representation in each equivalence class), the following data structure may be encapsulated by the data encapsulation engine 120:

| Client_ID | Client_NM | Client_Addr | Client_Phone | Client_Email | Client_SR |
|---|---|---|---|---|---|
| C1 | Joe Doe | 23 Avenue, #1 | {123-4567, 234-5678} | jdoe@xmail | {P&CB, WM} |
| C4 | John Smith | 123 Avenue | 999-9999 | smith@ymail | {WM, CAP} |

Example Solution to Scenario 2

Usually, tables in database are generated by operations such as join, meet, combine, subset, etc. The relation between two tables can be defined by determining if there are some common rows and columns (common elements) between them.

Algorithm 1 is applied to establish the relation among tables dt1 to dt6. Since the system consider common rows and columns, the approach uses table headers to build blocks. For example, for dt1, the system compares with dt2, dt3, dt4, and dt6 but not dt5 as they must share some column header if they share some rows and columns.

Algorithm 1: EntityRelations Walkthrough

Input: A Set of Tables {dt1, dt2, dt3, dt4, dt5, dt6}

Step 1: To determine if two tables are similar (have common elements), the system need to compare the tables within their blocks and see if there are some common row and columns:

| File_1 | File_2 | Is_Same | Num_Com_Row | Num_Com_Col |
|--------|--------|---------|-------------|-------------|
| dt1 | dt2 | 0 | 3 | 3 |
| dt1 | dt3 | 0 | 3 | 3 |
| dt1 | dt4 | 0 | 2 | 3 |
| dt1 | dt6 | 0 | 2 | 3 |
| dt2 | dt3 | 0 | 3 | 3 |
| dt2 | dt4 | 0 | 3 | 3 |
| dt2 | dt6 | 0 | 3 | 3 |
| dt3 | dt4 | 0 | 2 | 3 |
| dt3 | dt6 | 0 | 2 | 3 |
| dt4 | dt6 | 1 | 3 | 3 |

Step 2: As in this case the example only has one attribute: common elements, the system does not need to calculate weights and cut offs.

Step 3: As merging common elements will not yield new common elements, this step is not necessary.

Step 4: Not needed as there is no merge step.

Steps 5-7: Not needed as there is not a training set.

Step 8: By the common elements results above, the system can now define the linkage relation.

The common element relation is not an equivalence relation as it is not transitive obviously: Tables a and b have common elements and Tables b and c have common elements do not necessarily imply that Table a and c have common elements.

Algorithm 3 can be applied to extend the relation: Build graph by tables as vertices and draw edges between tables if they have common elements. The relation can be extended by the connected components of the graph and/or transitive closure if necessary.

Components are given by Overlap_ID and Degree_Rel shows how many tables are related. Clearly, to search master tables, we only need to search the tables with the same Overlap_ID (the same connected component).

Within Overlap_ID=1, dt1 and dt2 are master as others can be generated by them.

| File | Num_Row | Num_Col | Has_Dup | Overlap_ID | Degree_Rel |
|------|---------|---------|---------|------------|------------|
| dt1 | 4 | 5 | 0 | 1 | 4 |
| dt2 | 4 | 5 | 0 | 1 | 4 |
| dt3 | 3 | 3 | 0 | 1 | 4 |
| dt4 | 3 | 3 | 0 | 1 | 4 |

-continued

| File | Num_Row | Num_Col | Has_Dup | Overlap_ID | Degree_Rel |
|------|---------|---------|---------|------------|------------|
| dt5 | 5 | 5 | 1 | 2 | 0 |
| dt6 | 3 | 3 | 0 | 1 | 4 |

FIG. 4 is a schematic diagram of a computing device 400 such as a server. As depicted, the computing device includes at least one processor 402, memory 404, at least one I/O interface 406, and at least one network interface 408.

Processor 402 may be an Intel or AMD x86 or x64, PowerPC, ARM processor, or the like. Memory 404 may include a suitable combination of any type of computer memory that is located either internally or externally such as, for example, random-access memory (RAM), read-only memory (ROM), compact disc read-only memory (CDROM), or the like.

Each I/O interface 406 enables computing device 400 to interconnect with one or more input devices, such as a keyboard, mouse, camera, touch screen and a microphone, or with one or more output devices such as a display screen and a speaker.

Each network interface 408 enables computing device 400 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

Computing device 400 is operable to register and authenticate users (using a login, unique identifier, and password for example) prior to providing access to applications, a local network, network resources, other networks and network security devices. Computing devices 400 may serve one user or multiple users.

FIG. 5A and FIG. 5B are screenshots 500A and 500B, respectively, of example interfaces indicating linkages, according to some embodiments. As shown in FIG. 5A and FIG. 5B, entity relations can be mapped graphically having graph weights, edges, and nodes established between different data record elements. FIGS. 5A and 5B show which tables have duplicates, and how they are related by the induced relation graphs visually.

In these examples, the data records are transformed to generate the graph data structures using determined linkage relations and equivalence relations. The graph data structures, when represented visually, can be used to identify relationships, such as possible duplication redundancies, and can be used thus to compress or simplify data representations.

FIG. 6 is a screenshot 600 of an example interface indicating linkages, according to some embodiments. FIG. 6 shows client relationships that may be identified by graphs and merged by linkages.

Example Algorithms are described below:

---

Algorithm 1: EntityRelations

Input: A set E of entities
Output: A relation function ~: E × E → {0,1}
For each $e_1 \in E$ {
    Block = MatchingCandiatesOf($e_1$)
    For each $e_2 \in$ Block {
      1. Collect Similarity scores between $e_1$ and $e_2$ according to attributes selected
      2. Calculate weights among attributes and determine similarity cut off and linkages
      3. Merge and standardize entities among linked entities
      4. Repeat Steps 1-3 based on standardized entities till no more merges cannot be performed
      5. If there is a training set, build models to determine the similarity and continue on 6 and 7
      6. Calculate performance scores of multiple models if any
      7. Determine if $e_1$~$e_2$ based on performance scores
      8. Assign ~($e_1$, $e_2$) = 1 if $e_1$~$e_2$ and ~($e_1$, $e_2$) = 0 otherwise
    }
}
Return ~

---

Algorithm 2: EntityRelationCommunityComponents

Input: A set E of entities and a relation function ~: E × E → {0,1}
Output: A set C of community components.
G = MakeGraphFromEdge(E)
For each $e_1 \in E$ {
    For each $e_2 \in E$ {
      If $e_1$ ~$e_2$ AddEdge($e_1$, $e_2$) to G
    }
}
Return C = CommunityComponents(G)

---

Algorithm 3: DatabaseSchemaComponents

Input: A set T of tables in a database
Output: A set S of database schema components for the tables.
G = MakeGraphFromEdge(T)
For each $t_1 \in T$ {
    For each $t_2 \in T$ {
      If $t_1$ and $t_2$ have common elements (common rows and columns) AddEdge($t_1$, $t_2$) to G
    }
}
Return S = CommunityComponents(G)

---

Algorithm 4: ReflexiveClosure

Input: A set E of entities and a binary relation $R \subseteq E \times E$
Output: Reflexive closure Ref (R) of R
Ref (R) = R
For each $e \in E$ {
    Ref (R) = Ref (R) ∪ {(e, e)}
)
Return Ref (R) = Unique(Ref (R))

---

Algorithm 5: SymmetricClosure

Input: A set E of entities and a binary relation $R \subseteq E \times E$
Output: Symmetric closure Sym(R) of E
Sym(R) = R
For each $(e_1, e_2) \in R$ {
    Sym(R) = Sym(R) ∪ {($e_2$, $e_1$)}
)
Return Sym(R) = Unique(Sym(R))

---

Algorithm 6: TransitiveClosure

Input: A set $E = \{e_1, ..., e_n\}$ of entities and a binary relation $R \subseteq E \times E$
Output: Transitive closure Tran(R) of E
The adjacency matrix A (Adj(R)) of R is an n × n Boolean matrix by $A_{ij} = 1$ if there is an edge from $e_i$ to $e_j$ and 0 otherwise.
A = Adj(R)
W = Warshall(A)
Return Tran(R) = W /* Tran(R) is the relation given by W */
Warshall(R)
W = R
for k from 1 to n {
    for i from 1 to n {
      for j from 1 to n {
        $W_{ij} = W_{ij} \vee (W_{ik} \wedge W_{kj})$
      }
    }
}
Return W

---

Algorithm 7: FindEquivalenceClass

Input: An element e in the set E of entities and an equivalence relation $R \subseteq E \times E$
Output: Equivalence class Equ(e) of e
Equ(e) = {e}
For each $f \in E$ {
    If (e, f ) ∈ R
    Equ(e) = Equ(e) ∪ {f}
)
Return Equ(e) = Unique(Equ(e))

---

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The term "connected" or "coupled to" may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (e.g. personal computer, server, virtual environment, cloud computing system, network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information.

The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work.

Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

Although the embodiments have been described in detail, it should be understood that various changes, substitutions and alterations can be made herein without departing from the scope. Moreover, the scope of the present application is not intended to be limited to the particular embodiments of the process, machine, manufacture, composition of matter, means, methods and steps described in the specification.

Applicant notes that the described embodiments and examples are illustrative and non-limiting. Practical implementation of the features may incorporate a combination of some or all of the aspects, and features described herein should not be taken as indications of future or existing product plans. Applicant partakes in both foundational and applied research, and in some cases, the features described are developed on an exploratory basis.

As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

As can be understood, the examples described above and illustrated are intended to be exemplary only.

What is claimed is:

1. A computer system for automated estimation of relationships among a plurality of data elements, the system comprising:

a data receiver configured to receive one or more input data sets including the plurality of data elements, the one or more input data sets including a set of data records C;

a classifier engine computer processor configured to:
establish one or more linkage relations among data records in the set of data records C, the one or more linkage relations maintained as an adjacency matrix data structure on a non-transitory computer memory;
extend the one or more linkage relations into equivalence relations, updating the adjacency matrix data structure; and
generate an output data set by transforming the set of data records C using at least the adjacency matrix data structure, the output data set compressed relative to the set of data records C;

wherein the equivalence relations include $\stackrel{m}{=}$, and $D_1$ and $D_2$ are defined as subsets of data records in the set of data records C, and the one or more equivalence relations are used to partition the set of data records C into one or more partitions for generating the output data set, the output data set generated by transforming the set of data records C in accordance to the one or more partitions;

wherein the equivalence relations includes the relation:

given two sets of data sets $\mathbb{D}_1$ and $\mathbb{D}_2$, a transitive equivalence relation $\stackrel{m}{=}$ on $\mathbb{D}_1$, and a set function $f: \mathbb{D}_1 \to \mathbb{D}_2$ such that $D_1 \stackrel{m}{=} D_2$ implies $f(D_1)=f(D_2)$ then induced functions are provided:

$\pi: \mathbb{D}_1 \to \mathbb{D}_1/\stackrel{m}{=}$ and $f\stackrel{m}{=}: \mathbb{D}_1/\stackrel{m}{=} \to \mathbb{D}_2$ such that
$f = f\stackrel{m}{=} \pi$:

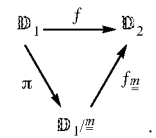

2. The computer system of claim 1, further comprising:
a data encapsulation engine configured to generate a graph data structure based on the stored adjacency matrix data structure, and to control rendering, on a display of a computer device, the graph data structure represented by one or more interactive visual interface elements whose graphical positioning and rendered connections therebetween are determined based at least on the stored adjacency matrix data structure.

3. A computer implemented method for automated estimation of relationships among a plurality of data elements, the method comprising:
receiving one or more input data sets including the plurality of data elements, the one or more input data sets including a set of data records C;
establishing one or more linkage relations among data records in the set of data records C, the one or more linkage relations maintained as an adjacency matrix data structure;
extending the one or more linkage relations into equivalence relations, updating the adjacency matrix data structure; and generating an output data set by transforming the set of data records C using at least the adjacency matrix data structure, the output data set compressed relative to the set of data records C;

wherein the equivalence relations include $\stackrel{m}{=}$, and $D_1$ and $D_2$ are defined as subsets of data records in the set of data records C, and the equivalence relations are used to partition the set of data records C into one or more partitions for generating the output data set, the output data set generated by transforming the set of data records C in accordance to the one or more partitions;

wherein the equivalence relations includes the relation:

given two sets of data sets $\mathbb{D}_1$ and $\mathbb{D}_2$, a transitive equivalence relation $\stackrel{m}{=}$ on $\mathbb{D}_1$, and a set function $f: \mathbb{D}_1 \to \mathbb{D}_2$ such that $D_1 \stackrel{m}{=} D_2$ implies $f(D_1) = f(D_2)$ then induced functions are provided:

$\pi: \mathbb{D}_1 \to \mathbb{D}_1/\stackrel{m}{=}$ and $\bar{f} \stackrel{m}{=} : \mathbb{D}_1/\stackrel{m}{=} \to \mathbb{D}_2$ such that $f = \bar{f} \stackrel{m}{=} \pi$:

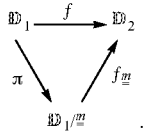

4. The method of claim 3, wherein the output data set is compressed relative to the set of data records C by removing duplicate rows from the set of data records C identified using the adjacency matrix data structure.

5. The method of claim 3, wherein the output data set is compressed relative to the set of data records C by merging data records from rows from the set of data records C identified using the adjacency matrix data structure, the merged rows of the output data set including common elements associated with a primary key identifier for each corresponding row.

6. The method of claim 3, wherein the establishing of the one or more linkage relations includes apply an algorithm that includes:

```
Input: A set E of entities
Output: A relation function ~: E × E → {0,1}
For each e₁ ∈ E {
    Block = MatchingCandiatesOf(e₁)
    For each e₂ ∈ Block {
        1.  Collect similarity scores between e₁ and e₂
            according to attributes selected
        2.  Determine weights among attributes and
            determine similarity cut off and linkages
        3.  Merge and standardize entities among linked
            entities
        4.  Repeat Steps 1-3 based on standardized
            entities till no more merges cannot be
            performed
        5.  Assign ~(e₁, e₂) = 1 if e₁~e₂ and ~(e₁, e₂) =
            0 otherwise
    }
}
Return ~
```

7. The method of claim 3, wherein the extending of the one or more linkage relations into the equivalence relations includes generating a graph data structure based on the one or more linkage relations, the graph data structure including a plurality of weights, edges, and nodes, the graph data structure configured to be traversable for identifying the corresponding equivalence relation of the equivalence relations for each linkage relation of the one or more linkage relations.

8. The method of claim 3, wherein the output data set is utilized to join two or more heterogeneous data sets, to remove duplicates from a single data set, or to find linkages in a data set or among data sets.

9. The method of claim 8, wherein the equivalence relations includes:

defining that if m is a linear regression model given by (b, $k_1, \ldots, k_t$), where b is an intercept of the linear regression model and $k_1, \ldots, k_t$ are co-efficients of the linear regression model, then $D_1 \stackrel{m}{=} D_2$ if and only if both $D_1$ and $D_2$ satisfy a linear regression model (b, $k_1, \ldots, k_t$), where $\mathbb{S}/\stackrel{m}{=}$ has two equivalence classes: data sets that have the linear regression model (b, $k_1, \ldots, k_t$) and data sets that do not have the linear regression model (b, $k_1, \ldots, k_t$), where $\mathbb{S}/\stackrel{m}{=}$ is the set S of data sets partitioned by $\stackrel{m}{=}$.

10. The method of claim 8, wherein the equivalence relations include: defining $D_1 \stackrel{m}{=} D_2$ if and only if both $D_1$ and $D_2$ satisfy a same linear regression model no matter how their columns are ordered.

11. The method of claim 8, wherein the equivalence relations includes the relation:

Let $$A = \begin{bmatrix} a_{11} & \cdots & a_{1t} \\ \vdots & \ddots & \vdots \\ a_{s1} & \cdots & a_{st} \end{bmatrix}$$

and $D_1 \stackrel{m}{=} D_2$ if and only if both $D_1$ and $D_2$ have A as a sub data set.

12. The method of claim 8, wherein the equivalence relations includes the relation: $D_1 \stackrel{m}{=} D_2$, where both $D_1$ and $D_2$ have similar address columns, and a string distance determination is utilized to classify the set of data sets with address columns using a transitivity closure of a similarity relation.

13. The method of claim 8, wherein the equivalence relations includes the relation: given a data set D, let $\mathbb{D}$ be the set of all rows in D, define $r_1 \stackrel{m}{=} r_2$ in $\mathbb{D}$ if and only if $r_1 = r_2$, such that $\stackrel{m}{=}$ is an equivalence relation on $\mathbb{D}$, and $\mathbb{D}/\stackrel{m}{=}$ is equivalent to removing row duplicates in D.

14. The method of claim 8, wherein the equivalence relations includes the relation: given a data set D with an address column, let D be the set of all rows in D, define $r_1 \stackrel{m}{=} r_2$ in $\mathbb{D}$ if and only if the addresses of $r_1, r_2$ are the same, and wherein classifying of each linkage relationship includes the relation where $\stackrel{m}{=}$ is an equivalence relation on D and $D/\stackrel{m}{=}$ is equivalent to finding house holdings in D.

15. The method of claim 8, wherein the equivalence relations includes the relation: given two data sets $D_1$ and $D_2$, let $\mathbb{E}$ be the set of all rows in $D_1$ and $D_2$, define $r_1 \stackrel{m}{=} r_2$ in $\mathbb{E}$ if and only if $r_1 = r_2$; and wherein the relation $\stackrel{m}{=}$ is an equivalence relation on $\mathbb{E}$ and $\mathbb{E}/\underline{\underline{m}}$ is equivalent to removing row duplicates in $D_1$ and $D_2$ and identifying links between $D_1$ and $D_2$.

16. The method of claim 8, wherein the equivalence relations includes the relation: given a dataset D and two equivalence relations $\underline{\underline{m}}_1$ and $\underline{\underline{m}}_2$ on rows of D, consider rows of D as vertices and draw edges between two vertices if the two vertices in the same equivalence class of $\underline{\underline{m}}_1$ or $\underline{\underline{m}}_2$; and wherein classifying of each linkage relationship includes classifying the rows of D by the connected components of the resulted undirected graph and denoting the equivalence relation generated by the classifications by $\underline{\underline{m}}_1 \smile \underline{\underline{m}}_2$.

17. The method of claim 8 wherein the equivalence relations includes classifying a set of data sets by using $\underline{\underline{m}}$.

18. The method of claim 8, wherein the equivalence relations includes the relation:

Let $\underline{\underline{m}}_1$ and $\underline{\underline{m}}_2$ be equivalence relations on X and Y, respectively and let $f:X \rightarrow Y$ be a function such that $x \underline{\underline{m}}_1 y \Rightarrow f(x) \underline{\underline{m}}_2 f(y)$; where $\tilde{f}$ is defined by $\tilde{f}([x])=[f(x)]$:

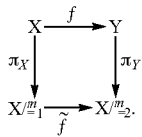

19. The method of claim 3, comprising: generating equivalence relations by subsets $\mathbb{S} \subseteq \mathbb{D} \times \mathbb{D}$, and to detect all equivalence relations and partition a set $\mathbb{D}$ of data sets, the method further includes: finding all subsets $\mathbb{S}$ of $\mathbb{D} \times \mathbb{D}$; and generating one or more equivalence relations from $\mathbb{S}$ (equivalence relation closure of $\mathbb{S}$).

20. A non-transitory computer readable medium storing machine interpretable instructions, which when executed by a processor, cause the processor to perform a method for automated estimation of relationships among a plurality of data elements, the method comprising:

receiving one or more input data sets including the plurality of data elements, the one or more input data sets including a set of data records C;

establishing one or more linkage relations among data records in the set of data records C, the one or more linkage relations maintained as an adjacency matrix data structure;

extending the one or more linkage relations into equivalence relations, updating the adjacency matrix data structure; and generating an output data set by transforming the set of data records C using at least the adjacency matrix data structure, the output data set compressed relative to the set of data records C;

wherein the equivalence relations include $\underline{\underline{m}}$, and $D_1$ and $D_2$ are defined as subsets of data records in the set of data records C, and the equivalence relations are used to partition the set of data records C into one or more partitions for generating the output data set, the output data set generated by transforming the set of data records C in accordance to the one or more partitions;

wherein the equivalence relations include the relation:

given two sets of data sets $\mathbb{D}_1$ and $\mathbb{D}_2$, a transitive equivalence relation $\underline{\underline{m}}$ on $\mathbb{D}_1$, and a set function $f: \mathbb{D}_1 \rightarrow \mathbb{D}_2$ such that $D_1 \underline{\underline{m}} D_2$ implies $f(D_1)=f(D_2)$ then induced functions are provided:

$\pi: \mathbb{D}_1 \rightarrow \mathbb{D}_1/\underline{\underline{m}}$ and $f \underline{\underline{m}}: \mathbb{D}_1/\underline{\underline{m}} \rightarrow \mathbb{D}_2$ such that $f = f\underline{\underline{m}} \pi$:

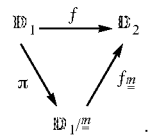

* * * * *